(12) United States Patent
Bigelow et al.

(10) Patent No.: US 8,042,300 B2
(45) Date of Patent: *Oct. 25, 2011

(54) METHODS OF MANAGING TIMBERLAND

(75) Inventors: Fred H Bigelow, Burien, WA (US);
Howard Duzan, Columbus, MS (US);
Venkatesh H Kumar, Mercer Island, WA (US); Robert H Lowery, Federal Way, WA (US)

(73) Assignee: Weyerhaeuser NR Company, Federal Way, WA (US)

( * ) Notice: Subject to any disclaimer, the term of this patent is extended or adjusted under 35 U.S.C. 154(b) by 639 days.

This patent is subject to a terminal disclaimer.

(21) Appl. No.: 11/691,140

(22) Filed: Mar. 26, 2007

(65) Prior Publication Data

US 2008/0236463 A1    Oct. 2, 2008

(51) Int. Cl.
*A01G 23/02* (2006.01)

(52) U.S. Cl. .................. 47/58.1 R; 111/100; 111/923

(58) Field of Classification Search .......... 111/100–117, 111/200, 900, 906–914, 923; 47/58.1 R, 47/58.1 FV, FOR. 100
See application file for complete search history.

(56) References Cited

U.S. PATENT DOCUMENTS

| 3,861,337 | A | 1/1975 | Thompson |
| 7,412,932 | B1 | 8/2008 | Bigelow |
| 2004/0268428 | A1 | 12/2004 | Duzan, Jr. et al. |

FOREIGN PATENT DOCUMENTS

| GB | 2388512 A | 11/2003 |
| RU | 2070379 C1 | 12/1996 |
| SU | 1482-605 A1 | 5/1986 |
| SU | 1491-404 A1 | 7/1989 |
| SU | 1639-509 A1 | 4/1991 |

OTHER PUBLICATIONS

Office Action dated Nov. 13, 2007, from U.S. Appl. No. 11/691,157, filed Mar. 26, 2007, now U.S. Patent No. 7,412,932.
Amendment After Non-Final Rejection filed Mar. 13, 2008, from U.S. Appl. No. 11/691,157, filed Mar. 26, 2007, now U.S. Patent No. 7,412,932.
Notice of Allowance dated May 20, 2008, from U.S. Appl. No. 11/691,157, filed Mar. 26, 2007, now U.S. Patent No. 7,412,932.
Notice of Allowance mailed Oct. 2, 2007, from U.S. Appl. No. 11/691,157, filed Mar. 26, 2007, now U.S. Patent No. 7,412,932, which is related to the present application.
Office Action dated Nov. 13, 2007, from U.S. Appl. No. 11/691,157, filed Mar. 26, 2007, now U.S. Patent No. 7,412,932, which is related to the present application.
Amendment After Non-Final Rejection, dated Mar. 13, 2008, from U.S. Appl. No. 11/691,157, filed Mar. 26, 2007, now U.S. Patent No. 7,412,932, which is related to the present application.
Notice of Allowance mailed May 20, 2008, from U.S. Appl. No. 11/691,157, filed Mar. 26, 2007, now U.S. Patent No. 7,412,932, which is related to the present application.

(Continued)

*Primary Examiner* — T. Nguyen
(74) *Attorney, Agent, or Firm* — Christensen O'Connor Johnson Kindness

(57) ABSTRACT

A method of managing timberland generally includes planting a softwood tree crop in first and second rows, wherein the tree crop has a tree spacing between adjacent trees and a row spacing between the first and second rows. The method further includes planting an energy crop in the row spacing, wherein the energy crop is a regenerating lignocellulosic energy crop. The method further includes periodically harvesting the energy crop for a predetermined number of harvests.

18 Claims, 5 Drawing Sheets

OTHER PUBLICATIONS

Byrd, N. A., and C.E. Lewis, "Managing Pine Trees and Bahiagrass for Timber and Cattle Production," General Report R8—GR 2, U.S. Department of Agriculture, Forest Service, Oct. 1983, pp. 1-9.

McNeel, J.F., "Intercropping for Food, Fiber, and Fuel on Pine Plantations in Virginia and North Carolina (Agri-Silviculture, Pine Plantations, Intercropping)," Dissertation Abstracts International 45(9B):2755, 1984 (abstract only).

U.S. Department of Agriculture, National Resources Conservation Service, Plant Materials Program, "2007 Progress Report of Activities," Booneville Plant Materials Center, Booneville, Arkansas, 9 pages.

U.S. Department of Agriculture, National Resources Conservation Service, Plant Materials Program, "PMC Agroforestry Study," Booneville Plant Press, Booneville, Arkansas, Dec. 2006, p. 2.

Garrett, H.E, and R.L. McGraw, "Alley Cropping Practices," in H.E. Garrett et al. (eds.), "North American Agroforestry: An Integrated Science and Practice," American Society of Agronomy, Inc. Madison, Wisconsin, 2000, pp. 149-188.

Tiarks A.E., "Biomass Production of Loblolly Pine Seeded Between Rows of Planted Loblolly Pine," Biomass and Bioenergy, 4(1):61-67, 1993.

Amateis, R.L., et al., "The Effect of Spacing Rectangularity on Stem Quality in Loblolly Pine Plantations," *Report No. 133 Presented at Loblolly Pine Growth and Yield Research Cooperative*, Jun. 2003.

Bandolin, T.H., and R.F. Fisher, "Agroforestry Systems in North America," *Agroforestry Systems 16*:95-118, 1991.

Barnett, J.P., "Effects of Morphological Grade on Field Performance of Container-Grown Southern Pine Seedlings," *Paper presented at Sixth Biennial Southern Silvicultural Research Conference*, Memphis, TN, Oct. 30-Nov. 1, 1990.

Barnett, J.P., et al., "Performance of Container and Barefoot Loblolly Pine Seedlings on Bottomlands in South Carolina,"*Southern Journal of Applied Forestry 17*(2):80-83, 1993.

Benjamin, T.J., et al., "Defining Competition Vectors in a Temperate Alley Cropping System in the Midwestern USA 4. The Economic Return of Ecological Knowledge," *Agroforestry Systems 48*:79-93, 2000.

Boyer, W.D., "Response of Planted Longleaf Pine Bare-Root and Container Stock to Site Preparation and Release: Fifth-Year Results," *Paper presented at Southern Silvicultural Research Conference*, Memphis, TN, Nov. 1-2, 1988.

Buergler, A.L., et al., "Forage Nutritive Value in an Emulated Silvopasture," *Agron. J. 98*:1265-1276, 2006.

Burner, D.M., "Influence of Alley Crop Environment on Orchardgrass and Tall Fescue Herbage," *Agron. J. 95*:1163-1171, 2003.

Burner, D.M., and C.T. MacKown, "Herbage Nitrogen Recovery in a Meadow and Loblolly Pine Alley" *Crop Sci. 45*:1817-1825, 2005.

Burner, D.M., and C.T. MacKown, "Nitrogen Effects on Herbage Nitrogen Use and Nutritive Value in a Meadow and Loblolly Pine Alley," *Crop Sci. 46*:1149-1155, 2006.

Burner, D.M., and D.K. Brauer, "Herbage Response to Spacing of Loblolly Pine Trees in a Minimal Management Silvopasture in Southeastern USA," *Agroforestry Systems 57*(1):69-77, 2003.

Burner, DM., and D.P. Belesky, " Diurnal Effects on Nutritive Value of Alley-Cropped Orchardgrass Herbage," *Crop Sci. 44*:1776-1780, 2004.

Campbell, GE, et al., "Design and Development of Agroforestry Systems for Illinois, USA: Slivicuitural and Economic Considerations," *Agroforestry Systems 13*:203-224, 1991.

Clark III, A., et al., "Influence of Initial Planting Density, Geographic Location; and Species on Juvenile Wood Formation in Southern Pine," *Forest Products Journal 39*(7/8):.42-48, Jul./Aug. 1989.

Clason. T., and J. Robinson, "From Pine Forest to a Silvopasture System," *Agroforesty Notes, Silvopasture-3, AF Note 18*, Apr. 2000, pp. 1-4.

Doran, F.S., et al., "Tree Crops for Marginal Farmland Loblolly Pine," Virginia Cooperative Extension, Publication No. 446-604, posted Apr. 1008. [online], [retrieved on Mar. 8, 2007]. Retrieved from the Internet <http://www.ext.vt.edu/pubs /forestry/446-604/446-604.html> pp. 1.-11.

Drever, C.R., et al., "Light-Growth Responses of Coastal Douglas-fir and Western Redcedar Saplings Under Different Regimes of Soil Moisture and Nutrients," *Canadian Journal of Forest Research 31*(12):2124-2133, Dec. 2001.

Dropplemann, K.J., et al., "Tree/Crop Complementarity in an Arid Zone Runoff Agroforestry System in Northern Kenya," *Agroforestry Systems 50*:1-16, 2000.

Etherington, D.M., and P.J. Mathews, "Approaches to the Economic Evaluation of Agroforestry Farming Systems," *Agroforestry System 1*:347-360, 1983.

Garrett, H.E., et al., "Walnut Agroforestry," Agricultural publication G5020, ™ 1993 to 2007 [online], [retrieved Mar. 8, 2007], retrieved from <http://mutextension.missouri.edu /explore/agguides/forestry/g05020.htm> pp. 1-4.

Gavaland, A., "Biofuel Production: Comparison of Woody Filler Crops and Intercropping," 1996 [online], [retrieved Feb. 27, 2007], retrieved from http://www.ademe.fr/partenaires/agrice/Fiches_GB /card.asp?nc=9601C0039> pp. 1-2.

Gillespie, A.R., et al., "Defining Competition Vectors in a Temperate Alley Cropping System in the Midwestern USA: 1 Production Physiology," *Agroforestry Systems 48*:25-40, 2000.

Guo, Y., et al; "Canopy Light Transmittance in Natural Stands of Upland Sites in Arkansas," *Proceedings of the 9th Biannual Sourthern Silviculture Research Conference*., Feb. 25-27, 1997, Clemson, South Caroline, General Technical Report SRS-20:618-622.

Haq, Z., "Biomass for Electricity Generation," *EIA Forecasts* [online], [retrieved Mar. 6, 2007] retrieved from <http://www.eia.doe.gov/oiaf/analysispaper/biomass> pp. 1-11.

Hatcher, R.L., et al., "Tree Crops for Marginal Farmland Black Walnut," Virginia Cooperative Extension, Publication No. 446-602, posted Apr. 1998 [online], [retrieved Jan. 26, 2006] retrieved from http://www.ext.vt.edu/pubs/forestry/446-602/446-602.html> pp. 1-15.

Henskens, E., et al., "Physiological Basis of Spacing, Effects on Tree Growth and Form in *Eucairyptus globulus*," *Trees Structure and Function 15*:365-377 Heidelberg, Germany, 2001.

Hodge, S., et al., "Alley Cropping: An Agroforestry Practice," *Agroforestry Notes 12*:Jan. 1-4, 1999.

Huxley, P.A., et al., "A Tree/Crop interface Orientation Experiment With a *Grevillea robusta* Hedgerow and Maize," *Agroforestry Systems 26*:23-45,1994.

Isaac, L., et al., "Hedgerow Pruning Management Effects on Maize Yield and Nitrogen Uptake in an Alley Cropping System in Haiti,"*Agron. J. 96*:1632-1640, 2004.

Jama, B., et al., "Shading Effects of Alley Cropped *Leucaena leucocephala* on Weed Biomass and Maize Yield at Mtwapa, Coast Province, Kenya," *Agroforestry Systems 13*1-11, 1991.

Jose, S., et al., "Defining Competition Vectors in a Temperate Alley Cropping System in the Midwestern USA: 2 Competition for Water," *Agroforestry Systems. 48*:41-59, 2000.

Jose, S., et al., "Defining Competition Vectors in a Temperate Alley Cropping System in the Midwestern USA: 3. Competition for Nitrogen and Litter Decomposition Dynamics," *Agroforestry Systems 48*:61-77, 2000.

Karim, A.B., et al., "The Effects of Between-Row (Alley Widths) and Within Row Spacings of *Gliricidia sepium* on Alley-Cropped Maize in Sierra Leone," *Agroforestry Systems 24*:81-93, 1993.

Kneeshaw, D.D., et al., "Patterns of Above- and Below-Ground Response of Understory Conifer Release 6 Years After Partial Cutting," *Canadian Journal of Forest Research 32*(2):255-265, Feb. 2002.

Knowles, R.L., "Spacing and Thinning Effect in Radiata Pine Agroforestry," *FRI Bulletin 151*:195-199, 1990.

Lin, C.H., et al., "Shade Effects on Forage Crops With Potential in Temperate Agroforestry Practices," *Agroforestry Systems 44*:109-119, 1999.

Martin, J., et al., "How to Manage Red Pine," *Forestry Facts, Dept. of Forest Ecology and Management, University of Wisconsin*, No. 82, Nov. 1996.

McGraw, R.L., et al., "Yield and Maturation of Alfalfa in Black Walnut Alley-Cropping Practice," *Proceedings of the Ninth American Agroforestry Conference*, Rochester, MN, Jun. 12-15, 2005, pp, 1-5.

Merwin, M., "Intercropping Black Walnut in Oregon's Willamette Valley" Jan. 1996, <http://www.aftaweb.org/entserv1.php-?page=16> [retrieved Mar. 5, 2007] pp. 1-5.

Seiter, S., et al., "Crop Yield and Tree-Leaf Production in Three Planting Patterns of Temperate-Zone Alley Cropping in Oregon, USA," *Agroforestry Systems 46*:273-288, 1999.

Sharma, M. et al., "Spacing Rectangularity Effect on the Growth of Loblolly Pine Plantations," *Can. J. For. Res. 32*:1451-1459, Feb. 2002.

South, D.B., et al., "Herbicides and Planting Date Affect Early Performance of Container-Grown and Bare-Root Loblolly Pine Seedlings in Alabama," *New Forests 1*(1):17-27, 1986.

South, D.B et al., "Early Gains From Planting Large-Diameter Seedlings and Intensive Management Are Additive for Loblolly Pine," *New Forests 22*(1-2):97-110, 2001.

South D.B., et al., "Nursery and Site Preparation Interaction Research in the United States," *New Forests 22*(1-2):43-58, 2001.

Vandermeer, J., "Maximizing Crop Yield in Alley Crops," *Agroforesty Systems 40*:199-206, 1998.

Williams, H.M., et al., "Root Growth Potential and Field Survival of Container Lobolly Pine Seedlings Fall Fertilized With Nitrogen," *Proceedings of the Eighth Biennial Southern Silvicultural Research Conference*, Auburn, AL., Nov. 1-3, 1994.

Williams, P.A and A.M. Gordon, "The Potential of Intercropping as an Alternative Land Use System in Temperate North America," *Agroforestry Systems 19*:253-263, 1992.

Nation Research Development Corporation's Application [1961] RPC at 134, 136.

*No Fume* v. *Frank Pitchford & Co. Ltd* [1935] 52 PRC.

International Business Machines Corporation's Application [1970] RPC 533.

Whitesell, C.D., "Effects of Spacing on Loblolly Pine in Hawaii After 11 Years," USDA Forest Service Research Note PSW-295, Pacific Southwest Forest and Range Experiment Station, Berkeley, Calif., 1974, 4 pages.

US 8,042,300 B2

METHODS OF MANAGING TIMBERLAND

TECHNICAL FIELD

Embodiments of the present disclosure generally relate to methods of managing timberland, and more specifically, to methods of managing timberland using multiple lignocellulosic crops, such as a tree crop and a regenerating energy crop.

BACKGROUND

Many methods are practiced for managing timberland. The various methods generally fall into specific categories of management practices, such as plantation management and natural stand management. Studies have shown, however, that desirable timberland management is achieved when trees are initially spaced in rows having a selected row spacing that allows for large tree growth for the longer term trees in the plot, as well as the entry of equipment for the purpose of managing tree growth. In that regard, adjacent trees within each row are initially spaced closer to one another to force straighter tree growth. These trees are later pruned and thinned to provide a source of early income from the shorter term trees and to promote enhanced lumber quality and value for the longer term trees, in accordance with the forestry practices described in U.S. Patent Application Publication No. 2004/0268428, filed on Jun. 11, 2003, the disclosure Of which is hereby incorporated by reference.

Alley cropping of trees and other crops, such as forages, landscaping plants, and agricultural crops, has also been practiced to improve the economic viability of the timberland during tree growth periods. However, there exists a need for an optimized method of managing timberland for a combination of tree and regenerating energy crops.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with one embodiment of the present disclosure, a method of managing timberland is provided. The method includes planting a softwood tree crop in first and second rows, wherein the softwood tree crop has a tree spacing between adjacent trees and a row spacing between the first and second rows. The method further includes planting an energy crop in the row spacing, wherein the energy crop is a regenerating lignocellulosic energy crop. The method further includes periodically harvesting the energy crop for a predetermined number of harvests.

In accordance with another embodiment of the present disclosure, a method of managing timberland is provided. The method includes planting a softwood tree crop in first and second rows, wherein the softwood tree crop has a tree spacing between adjacent trees and a row spacing between the first and second rows. The method further includes planting a first planting of an energy crop in the row spacing, wherein the energy crop is a regenerating lignocellulosic energy crop. The method further includes periodically harvesting the first planting for a first predetermined number of harvests. The method further includes, after the last of the first predetermined number of harvests, plowing the first planting of the energy crop, planting a second planting of the energy crop, and periodically harvesting the second planting for a second predetermined number of harvests.

DESCRIPTION OF THE DRAWINGS

The foregoing aspects and many of the attendant advantages of this disclosure will become more readily appreciated by reference to the following detailed description, when taken in conjunction with the accompanying drawings, wherein.

DETAILED DESCRIPTION

Figure 1:
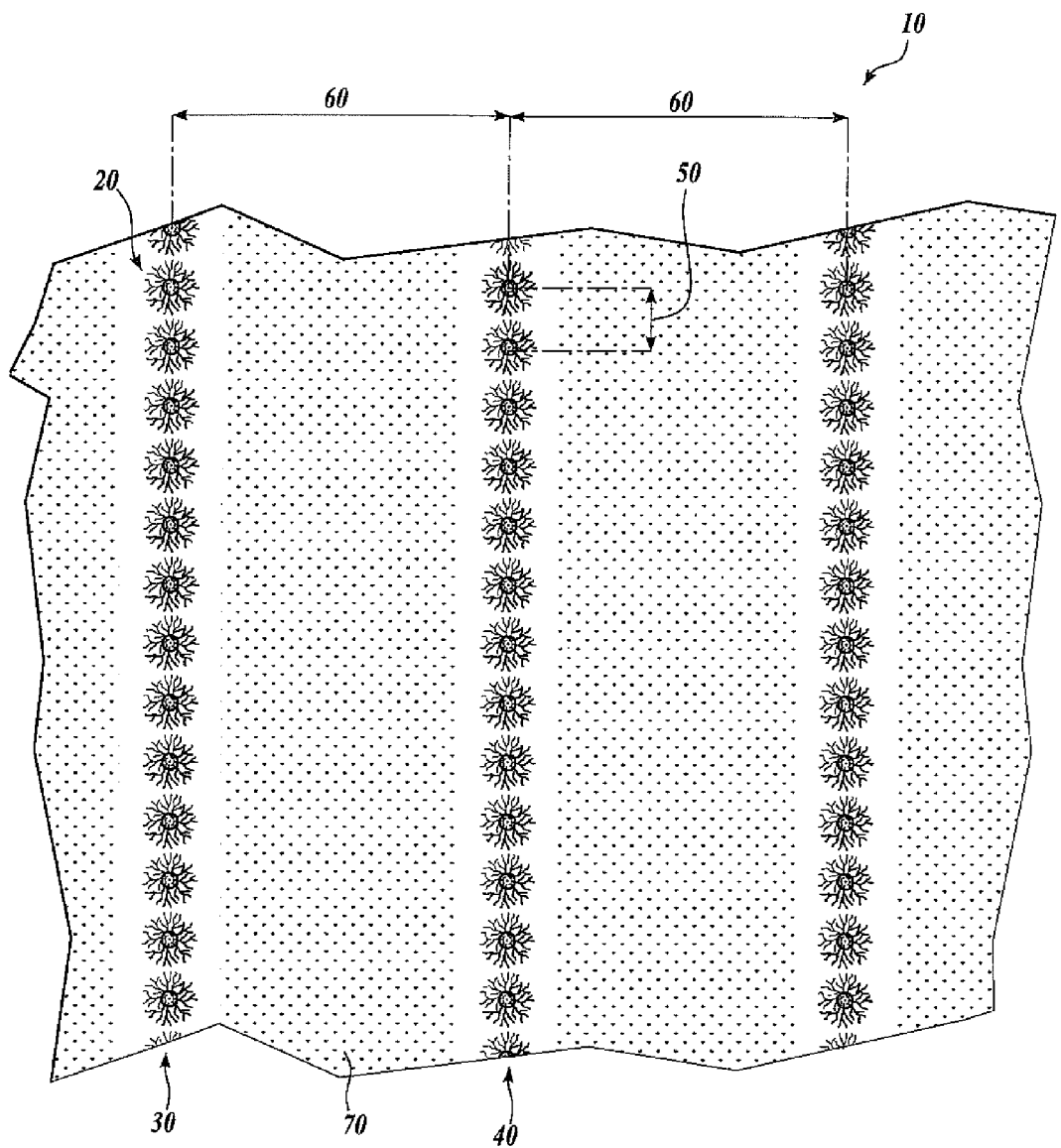
FIG. 1 is a plan view of a representative embodiment of a plot of land planted in accordance with the present disclosure having a tree crop and an energy crop.

Embodiments of the present disclosure are generally directed to methods of managing timberland. A method of managing timberland in accordance with one embodiment of the present disclosure may be best understood by referring to FIG. 1, in which a plan view of a plot of land 10 is shown. The method generally includes planting a tree crop 20 in first and second rows 30 and 40 having a tree spacing 50 between adjacent trees within each row, and a row spacing 60 between the first and second rows 30 and 40. The method further includes planting an energy crop 70 in the row spacing 60, wherein the energy crop 70 is planted within the same growing season as the tree crop 20.

The methods of managing timberland in accordance with the embodiments described herein align the cost of planting a long-term crop, such as trees, with the economic returns of harvesting a combination of tree and energy crops. In that regard, the tree crop is harvested for wood products, including construction products, lumber, plywood, woodchips, pulp for cellulosic products, etc. The energy crop is a regenerating crop harvested for the production of heat, electric power, other combustible power, and/or for conversion to transportation fuels and other useful energy products, such as ethanol. Therefore, methods in accordance with the embodiments of the present disclosure include periodically harvesting the energy crop 70 for a predetermined number of harvests, as well as harvesting the tree crop 20.

The tree crop includes trees in any growth state, including, but not limited to, trees, tree seedlings, rooted cuttings, and tree seeds. As a non-limiting example, the tree crop may include a single species of trees, for example, a single species of softwood or multiple species for forest diversity. As another non-limiting example, the tree crop may include patterned plantings of several genetic crops of a single species, as described in U.S. Patent Application Publication No. 2004/0268428, filed on Jun. 11, 2003, the disclosure of which is hereby incorporated by reference. Planting multiple genetic crops in a plot creates genetic diversity, which like forest diversity, helps to guard against losses from disease or insects.

Examples of suitable softwood trees include, but are not limited to, the following: pine trees, such as loblolly pine, jack pine, Caribbean pine, lodgepole pine, shortleaf pine, slash pine, Honduran pine, Masson's pine, Sumatran pine, western white pine, egg-cone pine, logleaf pine, patula pine, maritime pine, ponderosa pine, Monterey pine, red pine, eastern white pine, Scots pine, araucaria tress; fir trees, such as Douglas fir; and hemlock trees, including any hybrids of any of the foregoing. Suitable softwood species for a plot of land managed in accordance with the methods described herein are dependent upon desired wood products, as well as environmental and geographic factors.

Examples of suitable hardwood trees include, but are not limited to, the following: eucalyptus trees, such as Dunn's white gum, Tasmanian bluegum, rose gum, Sydney bluegum, Timor white gum, and the E. urograndis hybrid; populus trees, such as eastern cottonwood, bigtooth aspen, quaking aspen, and black cottonwood; and other hardwood trees, such as red alder, Sweetgum, tulip tree, Oregon ash, green ash, and willow, including any hybrids of any of the foregoing. Suitable hardwood species for a plot of land managed in accordance with the methods described herein are dependent upon desired wood products, as well as environmental and geographic factors.

Suitable energy crops are regenerating lignocellulosic energy crops, including perennial plant species such as switch grass (including panicum virgatum and other varieties of the genus panicum), miscanthus (including miscanthus giganteus and other varieties of the genus miscanthus), giant reed (arundo donax), energy cane (saccharum spp.), and napier grass (pennisetum purpureum). These energy-crops are grown for the specific purpose of producing energy from all or part of the resulting plant. As non-limiting examples, switch grass and miscanthus are energy crops that regenerate naturally following a full periodic harvest, for example, an annual harvest. These energy crops are normally harvested from the first or second year after planting, and the yields of the crop may continue to improve with each harvest until they level off around the fifth or sixth year. These crops also provide additional environmental benefits to a plot of land, such as erosion control, soil organic matter build-up, wildlife habitat, and potentially reduced fertilizer and pesticide requirements.

Once established, switch grass and miscanthus fields can be maintained for extended periods, but the advantages of new, higher yield varieties may warrant periodic replanting. In one embodiment, the regenerating energy crop is plowed and replanted every 6-12 years, after a predetermined number of harvests, e.g., 6-12 harvests if harvested annually. In another embodiment, the regenerating energy crop is plowed and replanted every 7-11 years, after a predetermined number of harvests, e.g., 7-11 harvests if harvested annually. In another embodiment, the regenerating energy crop is plowed and replanted every 8-10 years, after a predetermined number of harvests, e.g., 8-10 harvests if harvested annually. In yet another embodiment, the regenerating energy crop is plowed and replanted every 9 years, after a predetermined number of harvests, e.g., 9 harvests if harvested annually.

Suitable energy crops in accordance with the present disclosure are crops that can be compatibly planted with the tree crop when planted during the same growing season that the tree crop is planted. As an example of non-compatible crops, studies have shown that hybrid poplar is too competitive when planted at the same time as black walnut, resulting in losses of black walnut trees at an early stage in the growing cycle. Therefore, for better results, black walnut is generally planted two to three years prior to alley-cropped poplar at double the density. See Miles Merwin, "Intercropping Black Walnut in Oregon's Willamette Valley," *The Temperate Agroforester* (1996), the disclosure of which is herby incorporated by reference.

While the plot of land 10 in the illustrated embodiment of FIG. 1 is planted with at least two crops: a tree crop 20 and an energy crop 70, it should be appreciated that planting the plot of land with more than two crops is also within the scope of the present disclosure.

Figure 2:
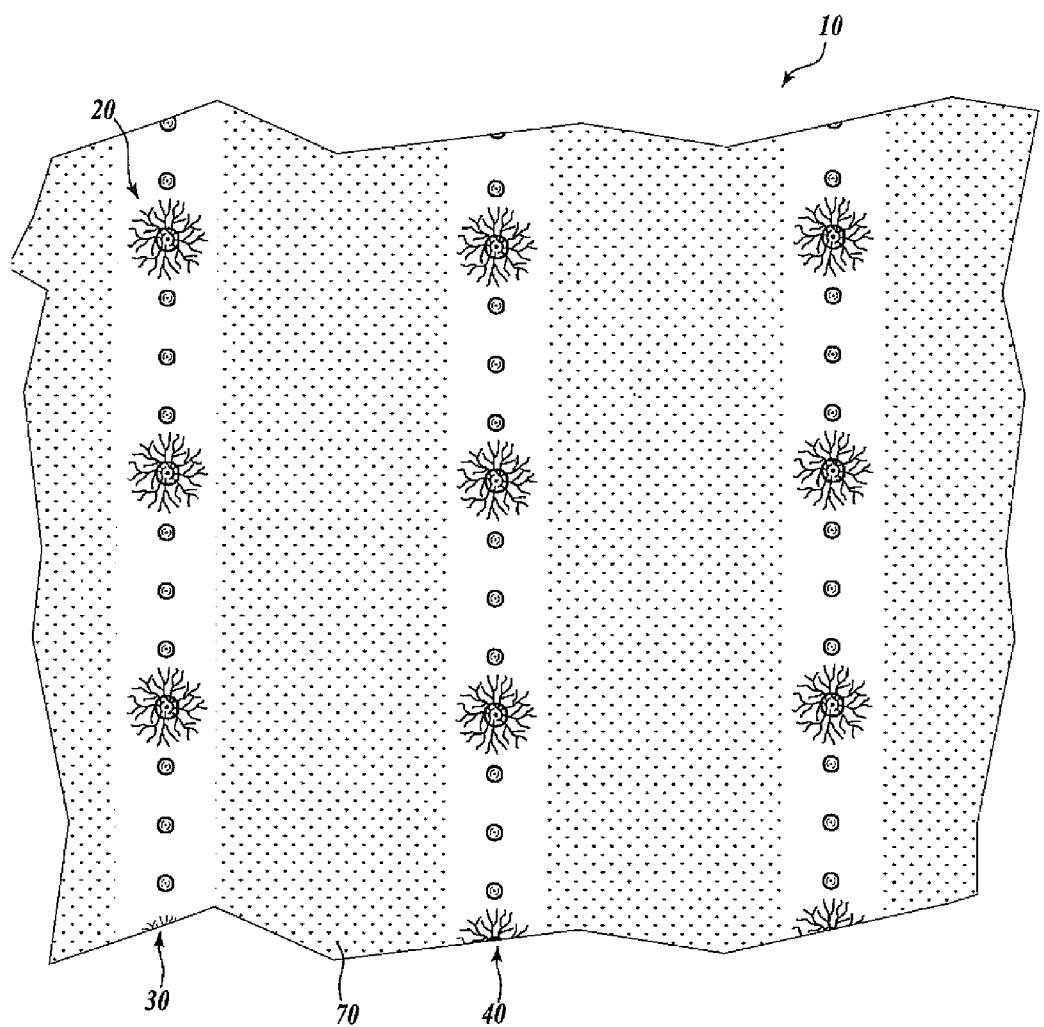
FIG. 2 is a plan view of the plot of land of FIG. 1 after a first partial harvest of the tree crop.
Figure 3:
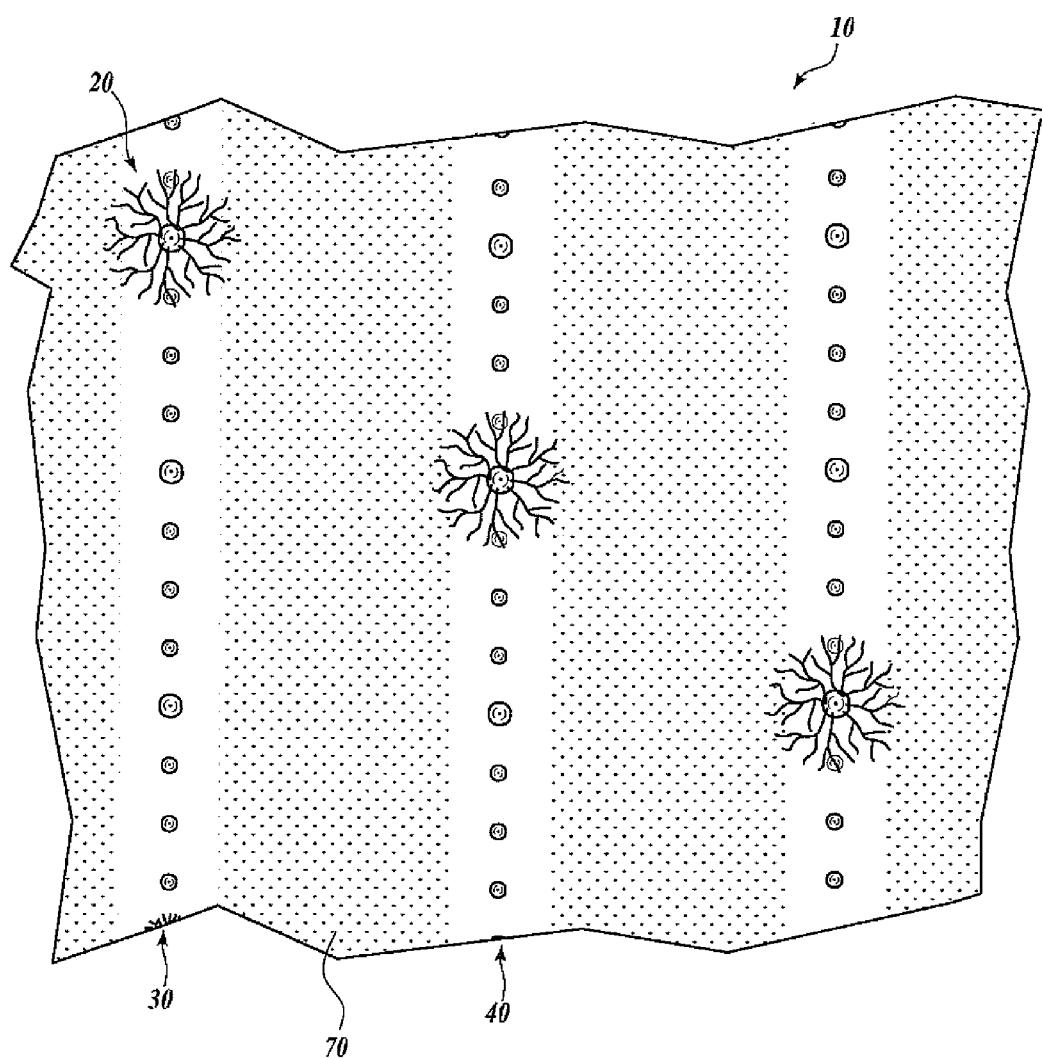
FIG. 3 is a plan view of the plot of land of FIG. 1 after a second partial harvest of the tree crop.

The specific nature of the plot 10 and the distances for tree spacing 50 and row spacing 60 is dependent upon a variety of factors, such as, but not limited to, the type or types of trees being grown, the nature of products desired from the trees, environmental conditions and impacts, hydrology, wildlife, biodiversity, sunlight restrictions due to tree crop growth, and the economics of balancing the harvest returns and combined revenues of a combined tree and energy plot. It should be appreciated that the number of trees and the number of rows seen in FIGS. 1-3 are merely for illustrative purposes. In that regard, the number of trees in a row and the number of rows in a plot can be configured in a repeating pattern over any sized area, such as one or more acres of land.

The tree spacing 50 is selected based on several factors, including optimizing the number of trees per plot area, and initially planting the trees at far enough distances from one another to encourage growth, but at close enough distances to force straight, upward growth, as well as to provide a source of early income from subsequent tree thinning. In one embodiment, the spacing between trees is about 4-6 feet. In another embodiment, the spacing between trees is about 5 feet. However, it should be appreciated that spacing between trees reasonably above or below these ranges is within the scope of this disclosure. It should further be appreciated that the spacing between trees may increase over time as the trees are thinned and/or partially harvested during the growth period, as best seen in FIGS. 2 and 3. The specifics of pruning, thinning, and partially harvesting the tree crop are discussed in greater detail below.

The row spacing 60 is also selected based on multiple factors. For example, the row spacing 60 is selected to provide ample room for large machinery and equipment to access the tree crop for the purpose of managing tree growth and development without damaging the trees, specifically, during the fertilizing, vegetation and pest control, thinning, pruning, and harvesting processes. Further, the row spacing 60 is selected to provide adequate spacing between trees in the later stages of the tree life to promote larger growth trees having enhanced lumber quality and value. In addition, the row spacing 60 is selected to optimize the combined revenues of the tree crop and the energy crop. In that regard, revenues are calculated based on predicted crop values. Moreover, row spacing 60 may be determined based on sunlight restrictions on the plot of land 10 as a result of tree crop growth, such that adequate sunlight reaches the energy crop. Other row spacing optimization considerations are also within the scope of the present disclosure and may include crop planting and growth management costs, as well as environmental effects on the plot of land.

In one embodiment, the row spacing is between about 15 and about 25 feet. In another embodiment, the row spacing is at least about 18 feet. In yet another embodiment, the row spacing is at least about 20 feet. However, it should be appreciated that row spacing reasonably above or below these ranges is within the scope of this disclosure.

The planting of the tree and energy crops may use single or multiple pass planting techniques. In accordance with the methods described herein, a separate planting pass may be used for each crop planted, e.g., one pass for the tree crop and one pass for the energy crop. In that regard, the tree crop is planted at a first planting pass followed at a later time by interplanting the energy crop at a second planting pass. Preferably, the tree crop is planted early in the planting season to optimize the chances of tree survival and early growth. The timing of the second planting pass is dependent upon the nature of the tree crops planted. However, it should be appreciated that both crops may be planted in the same growing season to simplify planting and to maximize the yields of the energy crop. Moreover, methods for simultaneous planting of both tree and energy crops are also within the scope of this disclosure.

Once the crops have been planted, a variety of processes are used to manage the growth and development of the tree and energy crops. Non-limiting examples of these processes include, alone or in combination, pruning, thinning, or applying any variety of fertilizer, herbicide, and/or pesticide. These processes may occur any number of times during growth and/or crop production. The timing of the various processes to manage growth and development is variable and is preferably aligned with the crop value. For example, pruning of the tree crop preferably occurs at a time when the final value of the tree crop may be most improved, when the value of products derived from pruning is maximized, or when the light and water available for the energy crop will be improved to improve the value of the products derived from the energy crop. By pruning, what is meant is the removal of branches to promote the growth of knot-free wood. As a non-limiting example, pruning of a softwood tree crop, such as loblolly pine, is typically done when the tree crop reaches a height of approximately 30 feet, which may fall anywhere between 8-14 years after planting. At that time, the tree limbs may be pruned to a height of between 18-21 feet from the ground.

Embodiments of the present disclosure further include harvesting the tree crop and the energy crop. In the illustrated embodiment of FIGS. 1-3, the tree crop is partially harvested before the final full harvest (see FIGS. 2 and 3). Partial harvesting of the tree crop in the plot provides a source of early income from the shorter term trees and promotes enhanced lumber quality and value for the longer term trees. Partial harvesting is done such that the final value of the tree crop will be maximized. In that regard, partial harvesting may be performed from about 8 to about 14 years after planting, as seen in FIG. 2. Additional partial harvesting may be performed from about 5 to about 10 years prior to the full harvest, as seen in FIG. 3.

Full harvesting of the remaining tree crop is performed at a time when the final value of the tree crop will be maximized. A softwood tree crop, such as loblolly pine, is typically fully harvested at about 27 to about 30 years from planting. It should be appreciated that full harvesting of the tree crop without an early partial harvesting is also within the scope of the present disclosure.

Low density stands that result hom pruning and harvesting in accordance with the present disclosure present less risk to the timberlands from reduced value growth and overstocking pressures, such as mortality, insect infestation (e.g., southern pine beetle) and the like. Additionally, the timing, amount and selection of fertilizers, herbicides, and/or pesticides employed are controlled to maximize value returned from the process.

Similarly, harvesting of the energy crop preferably occurs at a time or at multiple times when the value of products derived from the energy crop is high. In one embodiment, the energy crop is harvested periodically, for example, on an annual basis for a predetermined time period, for example, nine years, as described above. At the end of the predetermined number of harvests or years, the energy crop is plowed, and a second energy crop is replanted and harvested periodically for another predetermined number of harvests or years. At the end of the second set of predetermined harvests or years, the second energy crop is plowed, and a third energy crop is replanted and harvested again for another predetermined number of harvests or years. This pattern may continue until the tree crop is fully harvested, at which time the plot is cleared for starting anew with an initial planting of tree and energy crops.

Now referring to FIG. 4, a method of managing timberland in accordance with other embodiments of the present disclosure will be described in greater detail. The method is substantially identical in materials and operation as the previously described embodiment, except for differences regarding the row spacing and the energy crops grown in the row spacing, which will be described in greater detail below. For clarity in the ensuing description, numeral references of like elements of the plot of land 110 in FIGS. 4 and 5 are similar to the numeral references in the plot of land 10 in FIGS. 1-3, but in the 100 series.

Figure 4:
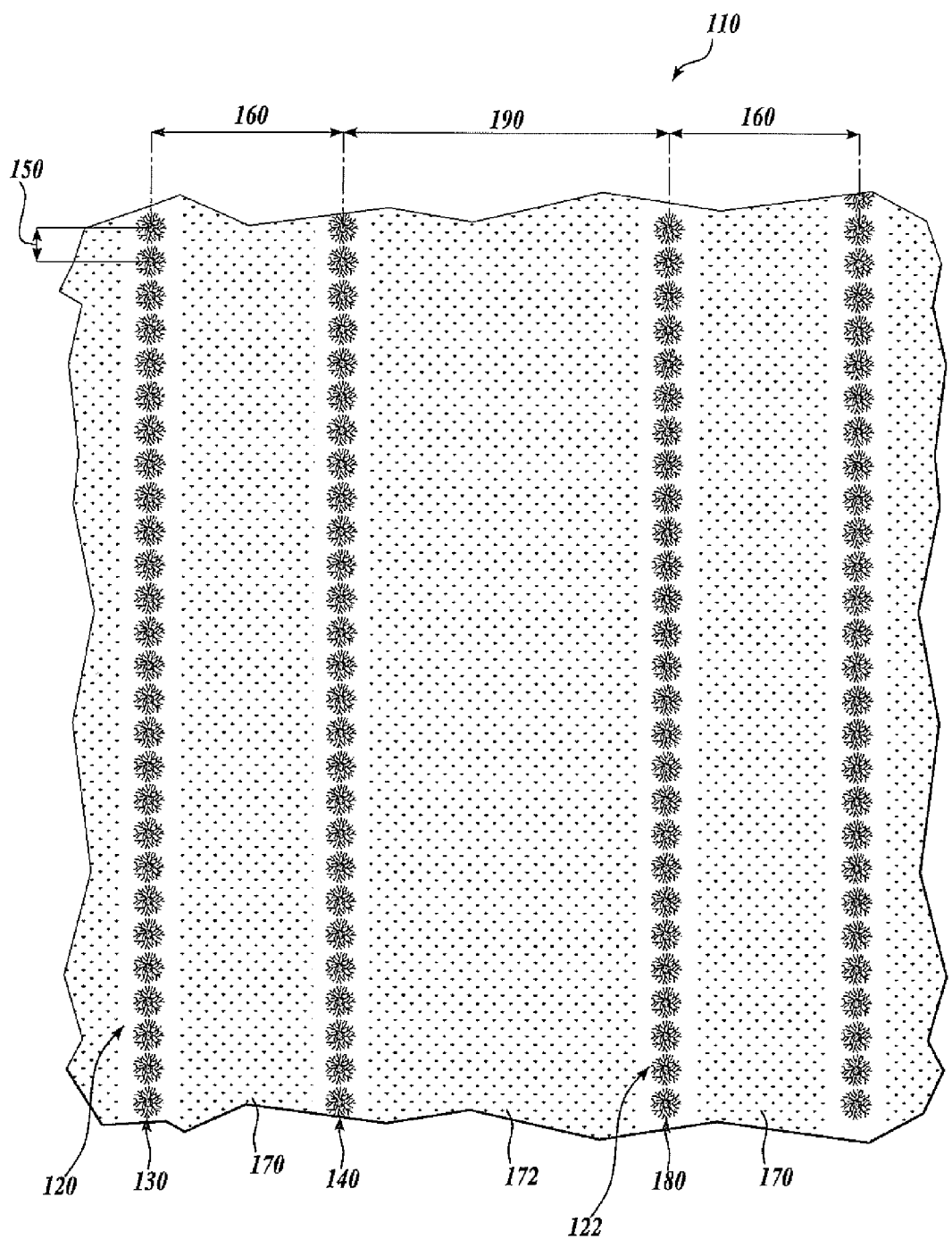
FIG. 4 is a plan view of a second representative embodiment of a plot of land planted in accordance with the present disclosure having first and second tree crops and first and second energy crops.
Figure 5:
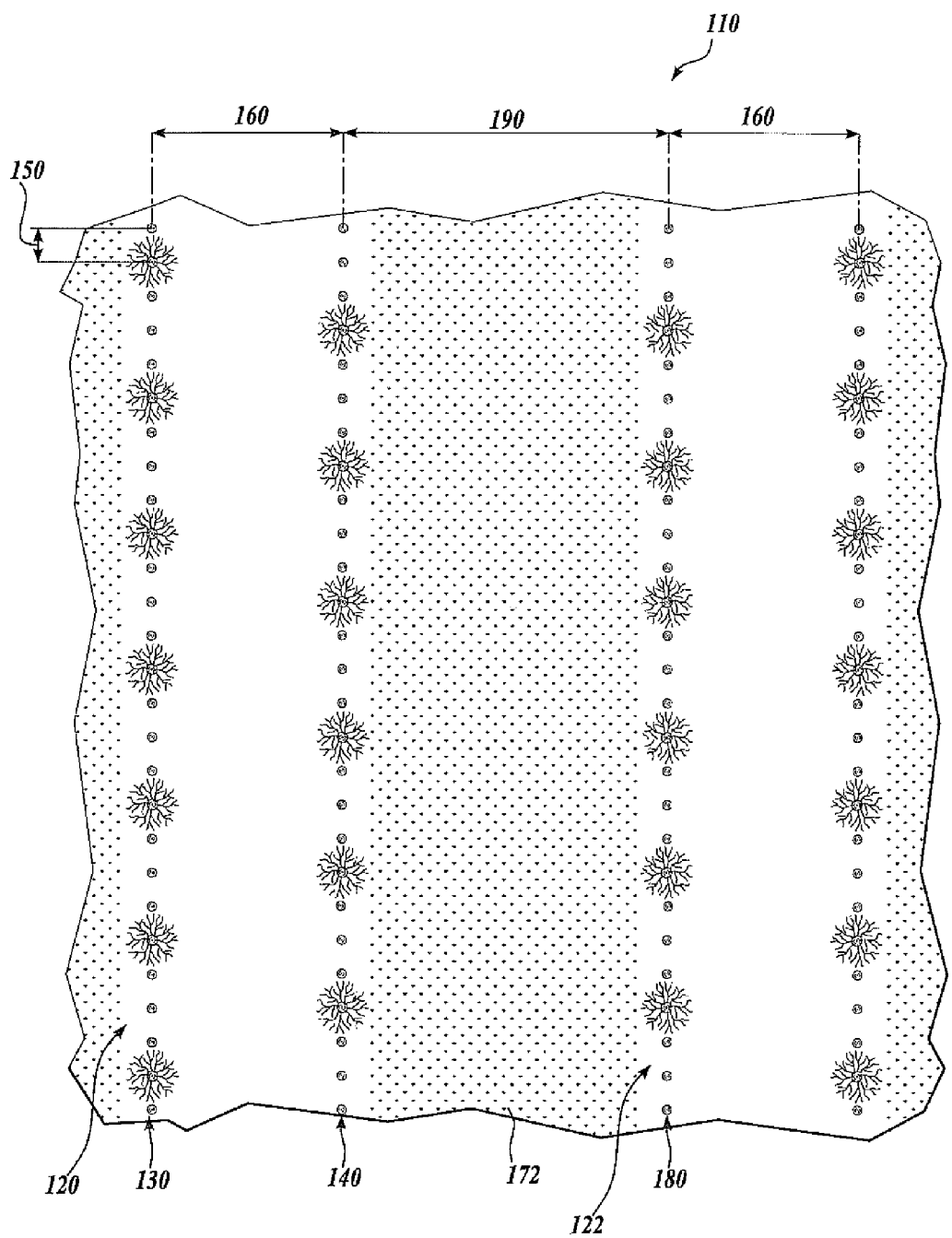
FIG. 5 is a plan view of the plot of land of FIG. 4 after a first partial harvest of the first and second tree crops and plowing or shading out of the first energy crop.

Referring to FIG. 4, a method of managing timberland having non-uniform row spacing between rows of trees is seen. Like the previously described embodiments, the method includes planting a first tree crop 120 in first and second rows 130 and 140 having a tree spacing 150 between adjacent trees within each row and a first row spacing 160 between the first and second rows 130 and 140. The method further includes planting a first energy crop 170 in the first row spacing 160. Unlike the previously described embodiments, the method includes planting a second tree crop 122 in a third row 180 having tree spacing 150 between adjacent trees, but having a second row spacing 190 between the second and third rows 140 and 180 that is different from the first row spacing 160 between the first and second rows 130 and 140. The method further includes planting a second energy crop 172 in the second row spacing 190.

It should be appreciated that the second energy crop 172 planted in the second row spacing 190 may be the same as or different than the first energy crop 170 planted in the first row spacing 160. Moreover, it should be appreciated that the second tree crop 122 may be the same as or different than the first tree crop 120.

Like the first row spacing 160, discussed above with reference to FIGS. 1-3, the second row spacing 190 is also a predetermined spacing based on the factors discussed above, such as optimizing the combined revenues of the first and second tree crops 120 and 122 and the first and second energy crops 170 and 172. In that regard, the second row spacing 190 is at least the same as the first row spacing 160 to provide adequate spacing between rows of trees for tree growth and machinery entry, as described above. However, depending on predicted crop values and corresponding revenues to be generated by the sale of the crops, the second row spacing 190 may be greater than the first row spacing 160. As a non-limiting example of the second row spacing 190 being greater than the first row spacing 160, the second row spacing 190 is at least 40 feet. In other non-limiting examples, the second row spacing 190 is in the range of about 30 feet to about 40 feet, in the range of about 40 feet to about 60 feet, in the range of about 60 feet to about 80 feet, in the range of about 80 feet to about 100 feet, and in the range of about 100 feet to about 120 feet.

As discussed above with reference to plot 10, predicted revenues of the combined crops may not be the only factor in determining the second row spacing in plot 110. For example, other considerations for the second row spacing include crop planting and growth management costs, as well as environmental effects on the plot of land. Moreover, while a repeating pattern of first row spacing 160 and second row spacing 190 is seen in the illustrated embodiment of FIG. 4, it should be appreciated that repeating, non-repeating, and other non-uniform row spacing patterns are all within the scope of the present disclosure.

Like the embodiments described above, the first and second energy crops 170 and 172 of this embodiment are also periodically harvested, for example, annually harvested, for a first predetermined number of harvests. However, in accordance with this embodiment, both of the first and second energy crops 170 and 172 may not be replanted after a certain predetermined number of harvests to allow for enhanced spacing around the tree crops 120 and 122 thereby resulting in enhanced tree crop growth.

In addition to enhanced tree spacing, adequate sunlight for the energy crops 170 and 172 may become a factor in crop production after a certain number of years of tree crop growth. For example, if the tree crops 120 and 122 provide substantial shade over the first row spacing 160, such that the first energy crop 170 does not receive adequate sunlight to grow for viable production, the first energy crop 170 can be removed, for example, plowed with the second energy crop 172 and not replanted or, in the alternative, shaded out by the tree crops 120 and 122 after a certain predetermined number of harvests. However, it should be appreciated that the second row spacing 190 is designed and configured to receive adequate sunlight beyond the certain predetermined number of harvests, despite tree crop growth, for periodic harvest throughout the life of the tree crops in accordance with methods described herein.

As a non-limiting example, after the last of the first predetermined number of harvests, the first and second energy crops 170 and 172 are plowed, and a second planting of the second energy crop 172 is replanted, as best seen in FIG. 5. The second planting of the second energy crop 172 is then periodically harvested for a second predetermined number of harvests. After the last of the second predetermined number of harvests, the second planting of the second energy crop 172 is plowed, and a third planting of the second energy crop 172 is replanted. The third planting of the second energy crop 172 is then periodically harvested for a third predetermined number of harvests. It should be appreciated, however, that the other plowing and replanting schedules that align with desired plot conditions for optimized tree and energy crops are also within the scope of the present disclosure.

The following examples are representative annual schedules for managing plots of land in accordance with embodiments described herein. EXAMPLE 1 concerns a plot of land having uniform row spacing, in accordance with the illustrated embodiment of FIGS. 1-3. EXAMPLE 2 concerns a plot of land having nonuniform row spacing, in accordance with the illustrated embodiment of FIGS. 4 and 5.

Example 1

In accordance with the illustrated embodiment of FIGS. 1-3, TABLE 1 represents an exemplary annual schedule for managing a plot of land having a tree crop and an energy crop. At year 0, the tree crop and the energy crop are planted within the same growing season. During years 1-9, the energy crop is annually harvested. At year 10, the energy crop is plowed and replanted. During years 11-18, the energy crop is annually harvested. At year 19, the energy crop is plowed and replanted. During years 10-27, the energy crop is annually harvested.

Meanwhile, at year 1, the tree crop is subjected to vegetation and/or pest control, which may include applying any variety of fertilizer, herbicide, or pesticide, as described above. At year 11, the tree crop is pruned. At years 12 and 23, the tree crop is partially harvested or thinned. At year 27, the remainder of the tree crop is fully harvested. After year 27, the plot can be cleared and replanted. It should be appreciated that vegetation and/or pest control, pruning, thinning, fertilization, and/or harvesting (both partial and full) may take place during any one or more years of this schedule for both the tree crop and the energy crop, as deemed necessary for optimizing plot growth.

TABLE 1

EXEMPLARY SCHEDULE FOR FIGS. 1–3

| Year | Tree Crop | Energy Crop |
|------|-----------|-------------|
| 0 | --plant-- | --plant-- |
| 1 | veg/pest control | harvest |
| 2 | | harvest |
| 3 | | harvest |
| 4 | | harvest |
| 5 | | harvest |
| 6 | | harvest |
| 7 | | harvest |
| 8 | | harvest |
| 9 | | harvest |
| 10 | | --plow and replant-- |
| 11 | --prune-- | harvest |
| 12 | --partial harvest-- | harvest |
| 13 | | harvest |
| 14 | | harvest |
| 15 | | harvest |
| 16 | | harvest |
| 17 | | harvest |
| 18 | | harvest |
| 19 | | --plow and replant-- |
| 20 | | harvest |
| 21 | | harvest |
| 22 | | harvest |
| 23 | --partial harvest-- | harvest |
| 24 | | harvest |
| 25 | | harvest |
| 26 | | harvest |
| 27 | --full harvest-- | harvest |

Example 2

In accordance with the illustrated embodiment of FIG. 4, TABLE 2 represents an exemplary annual schedule for managing a plot of land having a tree crop, assuming the first and second tree crops are subjected to the same planting and management schedules, and first and second energy crops, assuming the first and second energy crops are the same or similar types of regenerating lignocellulosic energy crop requiring similar planting and management schedules.

At year 0, the tree crops and the energy crops are planted. During years 1-9, the energy crops are annually harvested. At year 10, the energy crops are plowed and only the second energy crop is replanted. It should be appreciated, however, that resources need not be spent on plowing the first energy crop. Instead, the first energy crop can be shaded out of production by the tree crops, as described above. During years 11-18, the second energy crop is annually harvested. At year 19, the second energy crop is plowed and replanted. During years 10-27, the second energy crop is annually harvested.

Meanwhile, at year 1, the tree crops are subjected to vegetation and/or pest control, which may include applying any variety of fertilizer, herbicide, or pesticide, as described above. At year 11, the tree crop is pruned. At years 12 and 23, the tree crop is partially harvested or thinned. At year 27, the remainder of the tree crop is fully harvested. After year 27, the plot can be cleared and replanted. In this example, it should also be appreciated that vegetation and/or pest control, pruning, thinning, fertilization, and/or harvesting (both partial and full) may take place during any one or more years of this schedule for both the tree crops and the energy crops, as deemed necessary for optimizing plot growth.

TABLE 2

EXEMPLARY SCHEDULE FOR FIG. 4

| Year | First and Second Tree Crop | First Energy Crop | Second Energy Crop |
|---|---|---|---|
| 0 | --plant-- | --plant-- | --plant-- |
| 1 | veg/pest control | harvest | harvest |
| 2 | | harvest | harvest |
| 3 | | harvest | harvest |
| 4 | | harvest | harvest |
| 5 | | harvest | harvest |
| 6 | | harvest | harvest |
| 7 | | harvest | harvest |
| 8 | | harvest | harvest |
| 9 | | harvest | harvest |
| 10 | | --plow or shade out-- | --plow and replant-- |
| 11 | --prune-- | | harvest |
| 12 | --partial harvest-- | | harvest |
| 13 | | | harvest |
| 14 | | | harvest |
| 15 | | | harvest |
| 16 | | | harvest |
| 17 | | | harvest |
| 18 | | | harvest |
| 19 | | | --plow and replant-- |
| 20 | | | harvest |
| 21 | | | harvest |
| 22 | | | harvest |
| 23 | --partial harvest-- | | harvest |
| 24 | | | harvest |
| 25 | | | harvest |
| 26 | | | harvest |
| 27 | --full harvest-- | | harvest |

While illustrative embodiments have been illustrated and described, it will be appreciated that various changes can be made therein without departing from the spirit and scope of the disclosure.

The embodiments of the disclosure in which an exclusive property or privilege is claimed are defined as follows:

1. A method of managing timberland to optimize the combined revenue of a softwood tree crop and an energy crop, comprising:
  (a) planting a softwood tree crop in first and second rows, wherein the softwood tree crop has a tree spacing between adjacent trees and a row spacing in the range of about 15 to about 25 feet between the first and second rows;
  (b) planting an energy crop in the row spacing, wherein the energy crop is a regenerating lignocellulosic energy crop; and
  (c) periodically harvesting the energy crop for a predetermined number of harvests.

2. The method of claim 1, further comprising harvesting the softwood tree crop such that the final value of the softwood tree crop will be maximized.

3. The method of claim 1, further comprising partially harvesting a portion of the softwood tree crop such that the final value of the softwood tree crop will be maximized and harvesting the remainder of the softwood tree crop at a time when the final value of the softwood tree crop will be maximized.

4. The method of claim 1, further comprising pruning the softwood tree crop at a time that promotes an improved final value for the softwood tree crop or when the value of products derived from pruning is maximized.

5. The method of claim 1, wherein the energy crop is planted within the same growing season as the softwood tree crop.

6. The method of claim 1, wherein the predetermined number of harvests are in the range of 8 to 10 harvests.

7. The method of claim 1, wherein the energy crop is harvested annually.

8. The method of claim 1, wherein the softwood tree crop is selected from the group consisting of pine trees, araucaria trees, fir trees, and hemlock trees.

9. The method of claim 1, wherein the energy crop is selected from the group consisting of switch grass, miscanthus, giant reed, energy cane, and napier grass.

10. The method of claim 1, wherein the tree spacing is at least about 5 feet.

11. The method of claim 1, wherein the row spacing is at least about 20 feet.

12. A method of managing timberland to optimize the combined revenue of a softwood tree crop and an energy crop, comprising:
  (a) planting a softwood tree crop in first and second rows, wherein the softwood tree crop has a tree spacing between adjacent trees and a row spacing in the range of about 15 to about 25 feet between the first and second rows;
  (b) planting a first planting of an energy crop in the row spacing, wherein the energy crop is a regenerating lignocellulosic energy crop;
  (c) periodically harvesting the first planting for a first predetermined number of harvests; and
  (d) after the last of the first predetermined number of harvests, plowing the first planting of the energy crop, planting a second planting of the energy crop, and periodically harvesting the second planting for a second predetermined number of harvests.

13. The method of claim 12, further comprising, after the last of the second predetermined number of harvests, plowing the second planting of the energy crop, planting a third planting of the energy crop, and periodically harvesting the third planting for a third predetermined number of harvests.

14. The method of claim 12, further comprising harvesting the softwood tree crop such that the final value of the softwood tree crop will be maximized.

15. The method of claim 12, further comprising partially harvesting a portion of the softwood tree crop such that the final value of the softwood tree crop will be maximized and harvesting the remainder of the softwood tree crop at a time when the final value of the softwood tree crop will be maximized.

16. The method of claim 12, wherein the softwood tree crop is selected from the group consisting of pine trees, araucaria trees, fir trees, and hemlock trees.

17. The method of claim 12, wherein the energy crop is selected from the group consisting of switch grass, miscanthus, giant reed, energy cane, and napier grass.

18. The method of claim 12, wherein the predetermined number of harvests are in the range of 8 to 10 harvests.

* * * * *